United States Patent [19]
Loschke et al.

[11] Patent Number: 5,585,557
[45] Date of Patent: Dec. 17, 1996

[54] AIR DATA SYSTEM FOR MEASURING FLUID FLOW DIRECTION AND VELOCITY

[75] Inventors: Robert C. Loschke, Glendale; James D. Revell, Burbank; Frank J. Balena, Saugus; Floyd O. Hickmon, III, Los Angeles, all of Calif.

[73] Assignee: Lockheed Corporation, Calabasas, Calif.

[21] Appl. No.: 440,506

[22] Filed: May 12, 1995

[51] Int. Cl.$^6$ .......................... G01F 13/00; G01C 21/00
[52] U.S. Cl. .......................... 73/170.14; 73/181
[58] Field of Search .......................... 73/170.02, 170.14, 73/181, 178 T, 861.06

[56] References Cited

U.S. PATENT DOCUMENTS

| | | | |
|---|---|---|---|
| 3,548,653 | 12/1970 | Corey | 73/189 |
| 3,693,433 | 9/1972 | Kobori | 73/189 |
| 4,043,194 | 8/1977 | Tanner | 73/178 T |
| 4,112,756 | 9/1978 | MacLennan | 73/181 |
| 4,143,548 | 3/1979 | Graewe | 73/194 |
| 4,174,630 | 11/1979 | Nicoli | 73/194 |
| 4,351,188 | 9/1982 | Fukushima | 73/189 |
| 4,468,961 | 9/1984 | Berg | 73/180 |
| 4,484,478 | 11/1984 | Harkonen | 73/861.06 |
| 4,576,047 | 3/1986 | Lauer | 73/597 |
| 4,611,496 | 9/1986 | Komachi | 73/861.27 |
| 4,708,021 | 11/1987 | Braun | 73/861.06 |
| 4,831,874 | 5/1989 | Daubin | 73/189 |
| 4,920,808 | 5/1990 | Sommer | 73/170.14 |
| 4,995,267 | 2/1991 | Mikheev | 73/800 |
| 5,040,415 | 8/1991 | Barkhoudarian | 73/198 |
| 5,257,536 | 11/1993 | Beigbeder et al. | 73/170.02 |

*Primary Examiner*—Richard Chilcot
*Assistant Examiner*—William L. Oen
*Attorney, Agent, or Firm*—Louis L. Dachs

[57] ABSTRACT

The invention is a system for determining the physical characteristics of an incident fluid flow stream over a surface of a vehicle relative to an axis thereof, the apparatus. In detail, the invention includes at least one first pressure sensor mounted on the surface, the at least one first pressure sensor for receiving dynamic pressure signals generated by the convected boundary layer of the fluid flow stream and providing an output signal representative thereof. At least one array of second pressure sensors (pressure transducers) is positioned down stream of the at least one first pressure sensors, the second sensors of the at least one array each of said second pressure sensors providing a second output signal representative of the above pressure signals received thereby. A computer system is adapted to receive the first and second signals and to calculate the angular direction of the fluid flow relative to the axis and the velocity thereof.

9 Claims, 8 Drawing Sheets

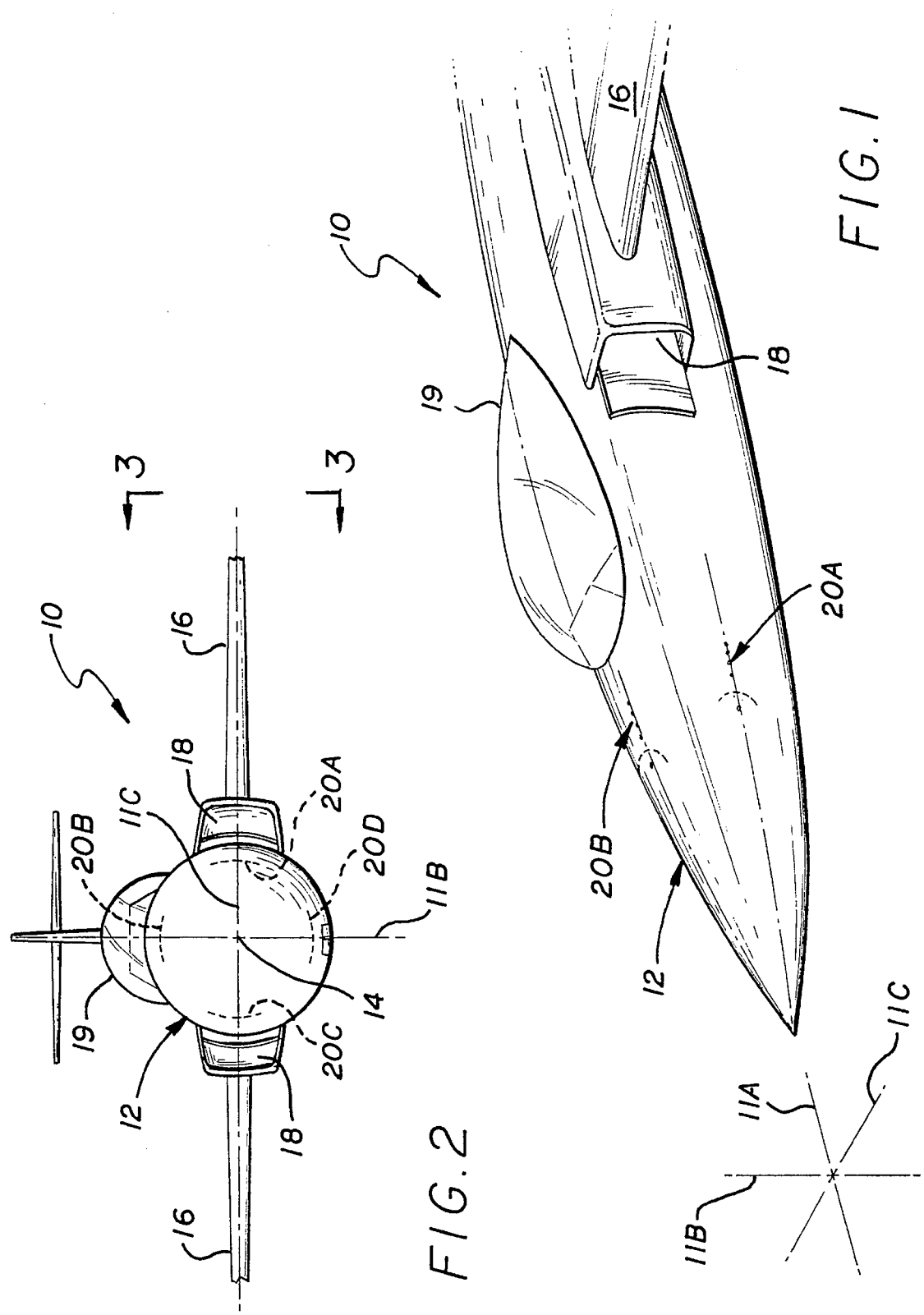

FIG. 6
F(T)
TIME ORIGIN OF STATIONARY WAVEFORM
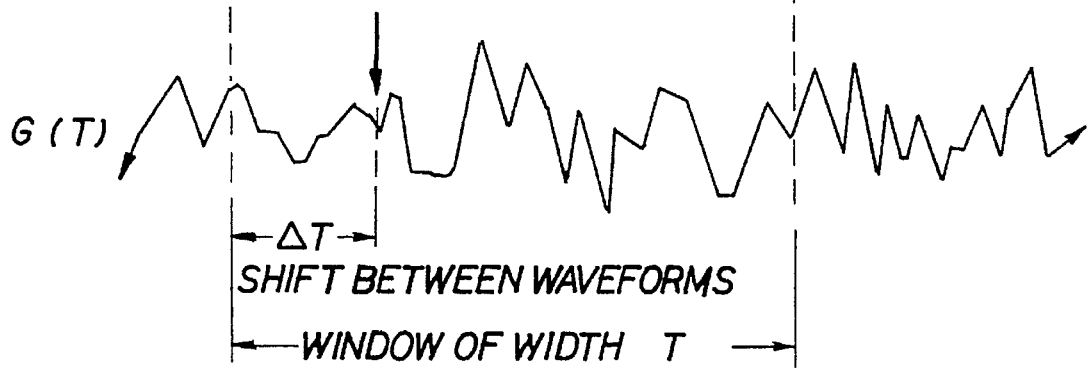
G(T)
TIME ORIGIN OF MOVING WAVEFORM
$\leftarrow \Delta T \rightarrow$
SHIFT BETWEEN WAVEFORMS
$\leftarrow$ WINDOW OF WIDTH T $\rightarrow$
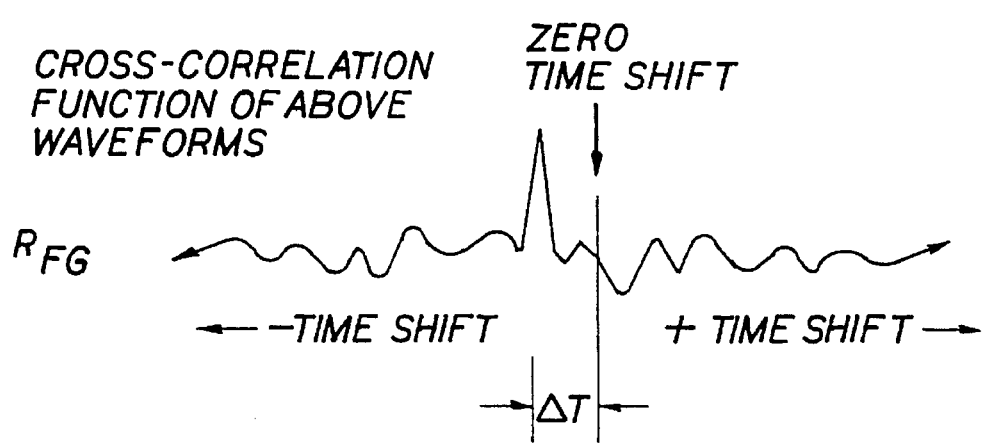
CROSS-CORRELATION FUNCTION OF ABOVE WAVEFORMS
$R_{FG}$
ZERO TIME SHIFT
$\leftarrow$ −TIME SHIFT      + TIME SHIFT $\rightarrow$
$\Delta T$

AIR DATA SYSTEM FOR MEASURING FLUID FLOW DIRECTION AND VELOCITY

BACKGROUND OF THE INVENTION

1. Field of the Invention

The invention relates to the field of fluid data systems and, in particular, to a hydrodynamic air data system for use on aircraft and the like.

2. Description of Related Art

The typical aircraft air data system uses pitot tubes that measure both dynamic and static pressure and calculates calibrated airspeed, Mach number, and barometric pressure altitude there from. Expressing the speed of sound as a function of only the square root of the absolute temperature, one needs only a gauge measurement of temperature for its calculation. From the Mach number and the calculated speed of sound, the true airspeed can be computed. However, pitot tubes must extend out from the fuselage of the aircraft. Thus they tend to increase the radar cross-section (RCS). On stealth aircraft, such as the F-117A, extensive shaping of such pitot tubes along with the application of expensive radar absorbing coatings are equipped to reduce the aircraft RCS to acceptable levels. Pitot tubes must also incorporate heaters to prevent the ports from icing. On extremely high speed flight, such as the space shuttle experiences on reentry, the pitot tubes are retracted to prevent damage from the intense aerodynamic heating and, thus, are kept retracted until the speed is reduced to around Mach 3. Flush mounted systems based on the use of lasers have been developed to make such measurements, however, they are both expensive and heavy.

Another critical measurement necessary for control of an aircraft is the angle between the aircraft longitudinal axis and the relative wind (angle of attack and angle of slip). The typical system for measuring these angles uses an external probe. The probe includes four pressure ports equidistant about the circumference thereof, two aligned with the vertical axis to measure angle of attack and the other two aligned with the horizontal axis for yaw measurement. If the aircraft is at any angle to the relative wind, the pressure measurement obtained by the two aligned ports will differ. Of course, this difference will be proportional to the angle of attack or angle of slips. However, it is obvious that such a probe has the same drawbacks as the pitot tube.

Active acoustic air data systems, which can provide airspeed and angle of attack, are also old in the art. Most are based upon the principle that the transmission time of sound waves in a fluid along a given path is a function of the sum of the local acoustic velocity plus the local fluid velocity component parallel to that path. If the fluid velocity is in the same direction as the direction of propagation of a sound wave, the transmission time of the sound wave between two points of given separation is minimum. Similarly, if the fluid velocity has a direction opposite to the direction of propagation of a sound wave, the transmission time of the sound wave between the two points is maximum. Accordingly, if sound waves are propagated in a fluid along a plurality of non-parallel paths, each path having the same length and each being coplanar with each other and with the direction of fluid velocity to be measured, the transmission times of the sound waves along each of the paths will vary in accordance with the fluid velocity and direction; i.e., the magnitude of the fluid velocity component along each path. However, all such systems are based on the concept of transmitting an acoustic signal (sound waves) by means of an electromechanical transducer (e.g., a sound source) through the fluid medium to one or more receivers and measuring the travel time to each downstream array receiver.

An example of such a system is found In U.S. Pat. No. 3,379,060 "Wind Meter" by C. B. Pear, Jr. A first electroacoustic transducer is provided for transmitting a pulse of sound along a plurality of non-parallel paths which are co-planar with the direction of a fluid velocity to be measured. A plurality of second electroacoustic transducers, one for each of the plurality of paths, are spaced concentrically about the first transducer and along the plurality of paths, for receiving the sound pulse transmitted by the first transducer. Associated with each receiving transducer is an indicating means which is energized when a pulse of sound arrives. There is also provided logic circuitry so that when a pulse is received by one of the receiving transducers, only its indicator is actuated and all other indicators are inhibited from operating until the logic circuit is reset. Since there will be only one path which is essentially parallel to the fluid flow velocity direction, the receiving transducer associated with that path will receive the sound pulse before it is received by any of the other receiving transducers, actuating its indicating means to the exclusion of all other indicating means. By observing which indicating means is activated, a measurement of fluid flow direction is obtained.

In order to determine fluid velocity, the first received sound pulse is used to generate a new pulse which drives the transmitting transducer after a predetermined fixed delay which is sufficient to allow the preceding sound pulse to have reached all of the receiving transducers under all conceivable weather conditions. By so driving the transmitting transducer, the pulse repetition rate will be a function of the minimum transit time of a sound pulse traveling from the transmitting transducer to one of the plurality of receiving transducers, which time is, of course, directly related to the fluid velocity and speed of sound. The fluid flow velocity is obtained directly by measuring the minimal pulse arrival time difference between the acoustical source and the downstream receiver transducers.

In U.S. Pat. No. 4,143,548 "Measuring The Speed Of An Aircraft" by E. Graewe, et al. a continuous ultrasonic wave transmitter transmits modulated waves in two opposite directions which are intercepted by a forward receiver and an aft receiver. The phase differences between the transmitter signal and receiver signals are used to calculate transit time differences from which the received signals are demodulated and the relative phase is used to calculate the speed of the aircraft. A non-zero angle between the longitudinal axis of the aircraft and the actual direction of propagation, can be compensated by including two orthogonally arranged receivers to obtain a speed vector (angle of attack).

A third method is disclosed in U.S. Pat. No. 4,112,756 "Ultrasonic Air Data System" by P. H. B. MacLennan, et al. This ultrasonic air data system determines the relative velocity of an aircraft with respect to the medium in one, two or three directions. In addition, it may determine the speed of sound and the approximate temperature. In the one direction system, a first ultrasonic transducer transmits a pulse to a second transducer where it is detected and reflected back to the first transducer and again reflected to the second transducer. The pulse transmit times for each direction are determined, and the relative velocity, the speed of sound and the approximate temperature are provided as a function of the transit times. In the two or three direction systems, three or four transducers are positioned in a two or three dimensional configuration. In the first half cycle, the first transducer transmits a pulse to the second where it is reflected to the third or last transducer in a two-dimension system and then to the last transducer in a three-dimension system. In the second half-cycle, the last transducer transmits a pulse which is reflected through the transducer arrangement to the first transducer. Transit times for pulse travel in each direction between pairs of transducers are determined, and relative velocities, speed of sound and approximate temperature are provided as a function of these transit times.

In all three of the above systems an ultrasonic transducer or "loud speaker" is required. All of the following acoustic systems require ultrasonic transducers or loud speakers: U.S. Pat. No. 4,708,021 "Arrangement For Contactless Measurement Of The Velocity Of A Moving Medium"—by H. Braun, et al., U.S. Pat. No. 5,040,415 "Nonintrusive Flow Sensing System" By S. Barkhoudarian, U.S. Pat. No. 4,484,478 "Procedure And Means For Measuring The Flow Velocity Of A Suspension Flow, Utilizing Ultrasonics" By E. Harkonen, U.S. Pat. No. 4,112,756 "Ultrasonic Air Data System" By P. Barry, et al., U.S. Pat. No. 4,995,267 "Method of Monitoring The State Of Elongated Object And Apparatus For Performing This Method" By S. Mikheev, et al. U.S. Pat. No. 4,351,188 "Method And Apparatus For Remote Measurement Of Wind Direction And Speed In The Atmosphere" By M. Fukushima, et al. U.S. Pat. No. 4,831,874 "Paradac Wind Measurement System" By S. Daubin, et al., U.S. Pat. No. 4,468,961 "Fluid Direction Meter Suitable For Angle Of Attack Meter For Aircraft" By L. Berg, U.S. Pat. No. 4,611,496 "Ultrasonic Flow Meter" By T. Komachi, U.S. Pat. No. 3,548,653 "Direction And Velocity Determining Apparatus" By V. Corey, U.S. Pat. No. 4,576,047 "Apparatus For Determining The Transit Time Of Ultrasonic Pulses In A Fluid" By R. Lauer, et al., U.S. Pat. No. 4,174,630 "Ultrasonic Anemometer" By J. Nicoli, U.S. Pat. No. 3,693,433 "Ultrasonic Anemometer" By Y. Kobori, et al., and U.S. Pat. No. 4,043,194 "Wind Shear Warning System"—By J. Tanner.

Thus it is a primary object of the subject invention to provide a hydrodynamic data system for a vehicle such as an aircraft and the like that is flush with the surface of the vehicle.

It is another primary object of the subject invention to provide a hydrodynamic air data system for a vehicle such as an aircraft and the like.

It is a further object of the subject invention to provide an acoustic air data system for a vehicle such as an aircraft and the like that uses only passive .acoustic sensors.

It is a still further object of the subject invention to provide a hydrodynamic air data system for a vehicle such as an aircraft and the like that can provide true air speed, Mach No., absolute temperature, barometric altitude and angle of attack.

SUMMARY OF THE INVENTION

The invention is a system for determining the physical characteristics of an incident fluid flow stream over a surface of a vehicle relative to an axis thereof. In detail, the invention includes at least one first pressure sensor mounted on the surface, the at least one first pressure acoustic sensor for receiving dynamic pressure fluctuations generated by the turbulent boundary layer of the fluid flow stream being convected with the flow and providing an output signal representative thereof. At least one array of second pressure sensors is positioned down stream of the at least one first pressure sensors, the second sensors of the at least one array each of said second pressure sensors providing a second output signal representative of the above turbulent pressure fluctuating signals received thereby. A computer system is adapted to receive the first and second signals and to calculate the angular direction of the fluid flow relative to the axis and the velocity thereof, preferably using statistical cross-correlation techniques.

In one embodiment, the system includes a first dynamic pressure sensor and an array of second dynamic pressure sensors mounted in an arc behind the first sensor equidistant therefrom. The first dynamic pressure sensor is located on the longitudinal axis of the vehicle with the number of second pressure acoustic sensors equally distributed on either side thereof. In another embodiment, there is an array of first sensors and two arrays of second sensors. Each first sensor can be "cross-correlated" with each sensor in the arrays of second sensors. Thus this arrangement provides increased redundancy.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a partial perspective view of an aircraft illustrating the location of the hydrodynamic air data system.

FIG. 2 is front view of the aircraft shown in FIG. 1 also illustrating the location of the hydrodynamic air data system.

FIG. 6 is a graph illustrating cross-correlation methodology.

DESCRIPTION OF THE PREFERRED EMBODIMENT

Figure 3:
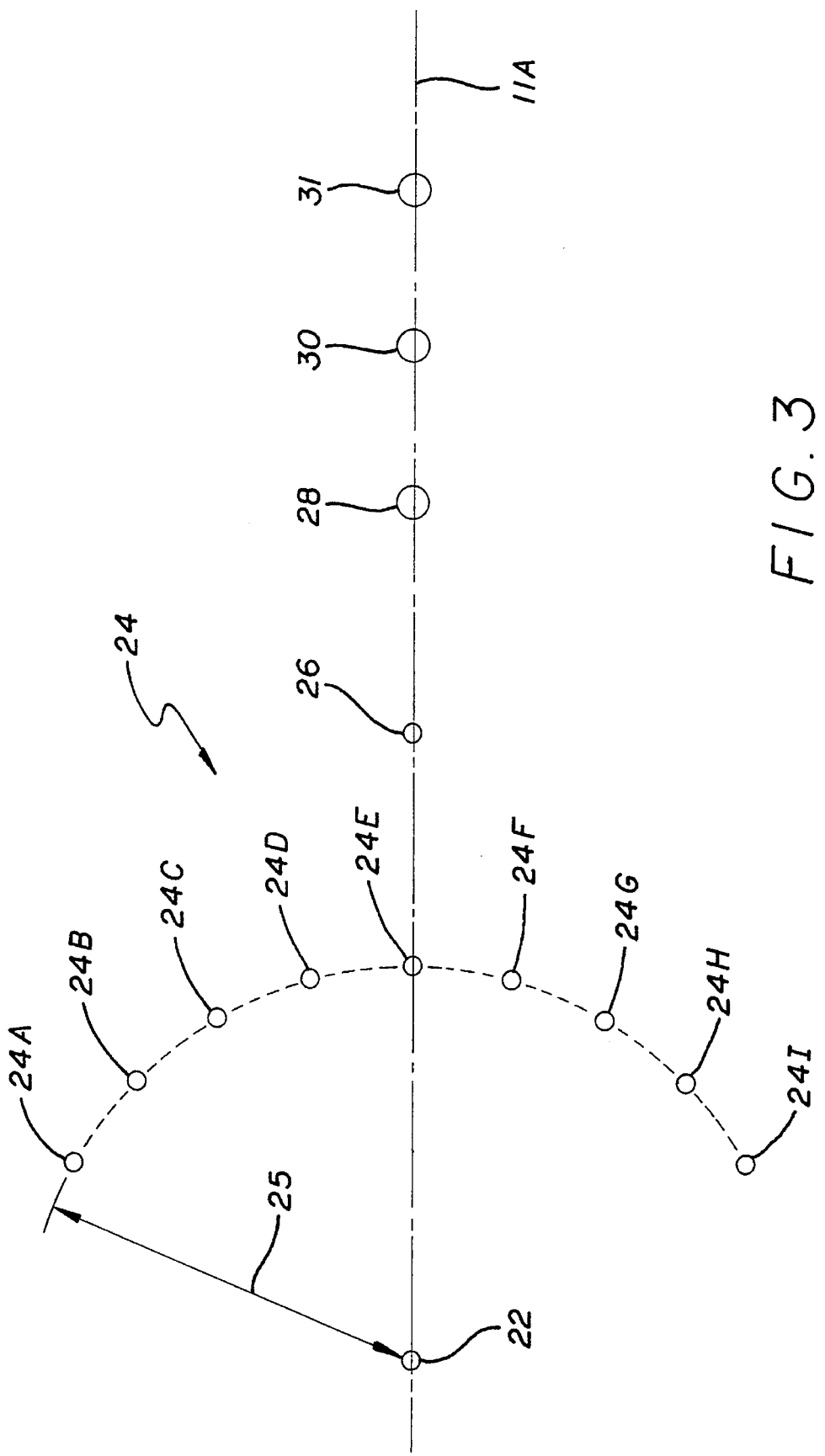
FIG. 3 is a partial side view of the aircraft shown in FIG. 2 taken along the arrow 3, particularly illustrating one of the hydrodynamic air data systems.

A partial view of an aircraft is provided in FIGS. 1–4 with the aircraft generally indicated by numeral 10 and having a longitudinal axis 11 A, vertical axis 11B and a lateral axis 11C. The aircraft 10 includes a fuselage 12 having a nose 14, wings 16 engine inlets 18 and a cockpit 19. Four hydrodynamic air data systems 20A–20D are mounted on the fuselage 12 in proximity to the nose 14. The system 20A includes a first hydrodynamic sensor 22 (microphone) and an array 24 of second hydrodynamic sensors 24A-I mounted in an arc behind the sensor 22 equidistant therefrom, with the distance indicated by numeral 25. As illustrated, the hydrodynamic sensor 22 is located on the longitudinal axis 11A with the number of second hydrodynamic sensors 24A-I equally distributed on either side thereof and second hydrodynamic sensor 24E on the axis 11A. Mounted on the longitudinal axis behind the array 24 is a static pressure sensor 26, a passive radiometer 28 for measuring ambient temperature, and a passive radiometer 30 for measuring water vapor content and a wet bulb anemometer 31, or similar instrument, for measuring dew point temperature. The hydrodynamic pressure air data system 20C is mounted on the opposite side of the aircraft in a similar fashion, while hydrodynamic pressure sensor air data systems 20B and 20D are mounted ninety degrees thereto with the sensor 22 and array 24 aligned with the vertical axis 11B of the aircraft. It must be stressed that the location, number of sensors in the array 24 may vary depending upon the design requirements for the particular aircraft and the particular placement illustrated is for purposes of illustration only. The first sensor 22, and all the sensors of the array 24, pressure sensor 26, radiometers 28 and 30, and anemometer 31.

The passive approach involves the use of cross-correlation analysis to determine the time lag or delay between a stimulus and a response. The stimulus is the convected turbulent boundary layer pressure fluctuations at the reference sensor 22 and the response is the pressure fluctuation received by each of the sensors 24A-I of the array 24.

Figure 5:
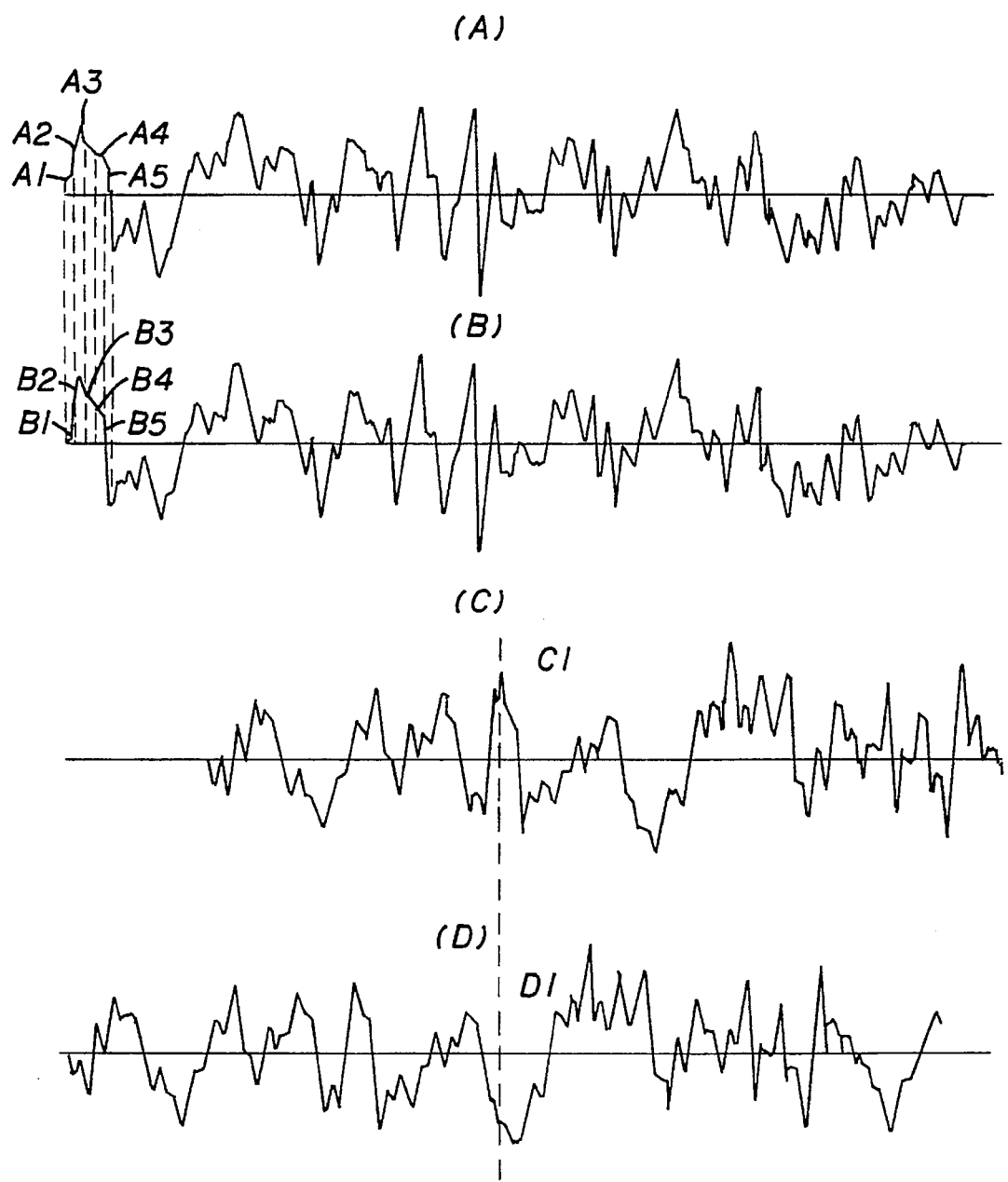
FIG. 5 is a graph illustrating auto-correlation methodology.

A good method of measuring the similarity between two waveforms is to multiply them together, ordinate by ordinate, and to add the products over the duration of the waveforms (cross-correlation). To assess the similarity between waveforms a and b of FIG. 5, one multiples ordinates $a_i$ by $b_1$, $a_2$ by $b_2$, and so on, and add these products to obtain a single number which is a measure of the similarity. This may be done with either continuous or sampled signals. In FIG. 5, waveforms A and B are identical, so that every product contributes a positive term to their sum. The sum is, therefore, large and is defined as the auto-correlation. If, However, the same process is performed on waveforms a and d, which are not identical one finds that each positive product is canceled by a negative product; the sum is, therefore, small and the waveforms are dissimilar.

Now consider waveforms c and d. They are identical in shape, but one is displaced in time. If one now perform the process of multiplying ordinates (of which $c_1$ and $d_1$, are typical), one finds again that every positive product tends to be canceled by a negative product, and that the sum is small. Thus, if one were to plot the similarity between a waveform of the type a and a time-shifted version of itself, one would expect the resulting function to assume small values for large time shifts, and to rise to a large positive maximum value when the time shift is zero. This is the auto-correlation function of the broadband random signal, used in the example of FIG. 5. A sine wave becomes identical to itself whenever the time shift is an integral number of periods and; thus, the auto-correlation function is itself periodic. However, with broadband random noise a very small time shift is sufficient to destroy the similarity and the similarity never returns. Thus the auto-correlation function is a sharp impulse that decays quickly from a central maximum at zero time shift to Very low values as time shifts become large.

While the auto-correlation function is concerned with the similarity between a waveform and a time shifted version of itself one may apply the same measure of similarity to the case of two wave forms which are not identical (cross-correlation). Referring to FIG. 6 the two waveforms through a "window" of width (2T), and we estimate the similarity of the two waveforms within this interval by repetitively multiplying ordinates, summing products, and time shifting. The bottom trace is a graph of the similarity, as a function of the time shifts between the two waveforms. The cross-correlation function of the two waveforms, f(t) and g(t), is a graph of the similarity between f(t) and the delayed $g(t+\Delta t)$ as a function of the delay between them.

Figure 4:
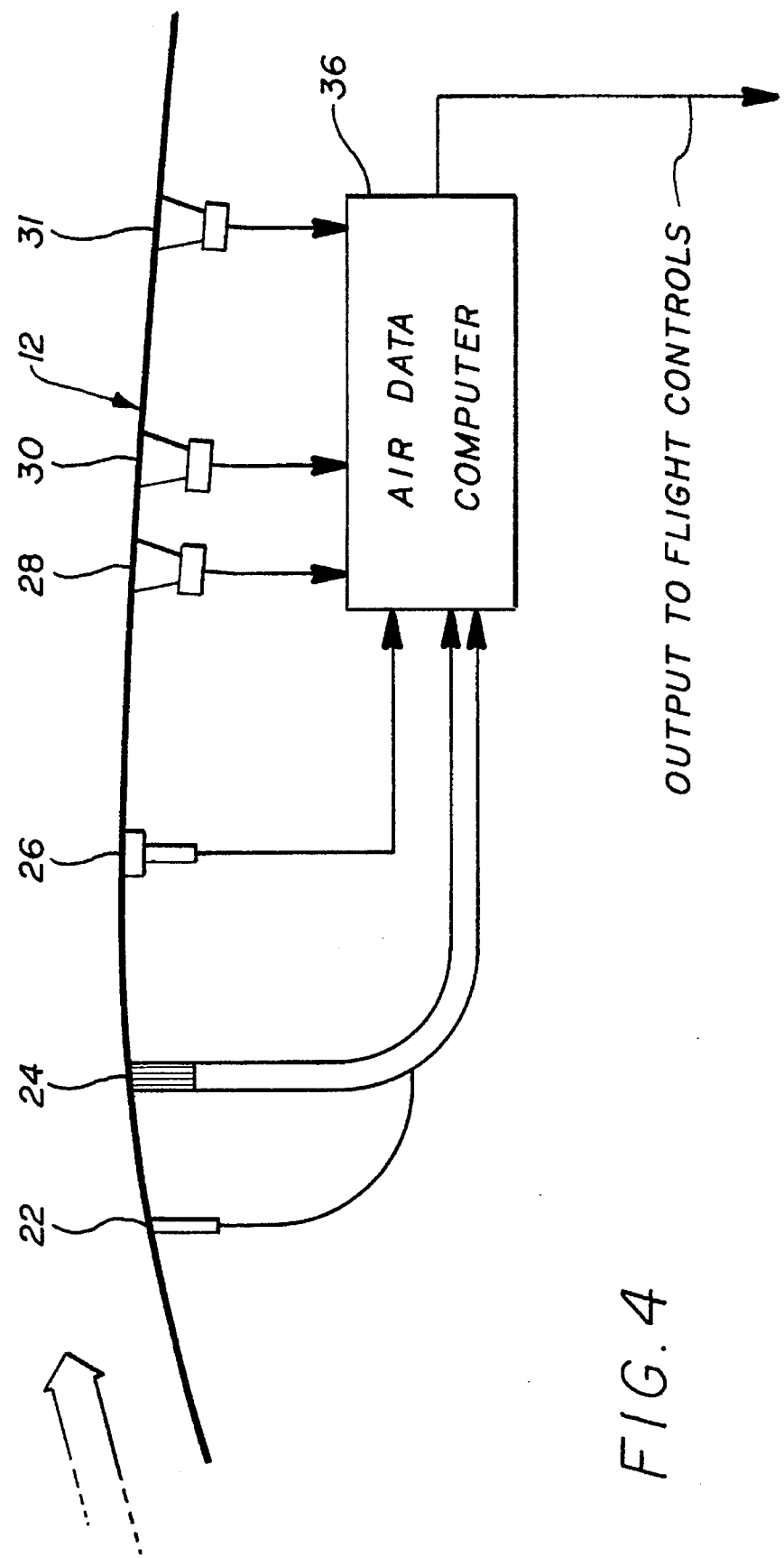
FIG. 4 is a schematic representation of the hydrodynamic air data system.
Figure 7:
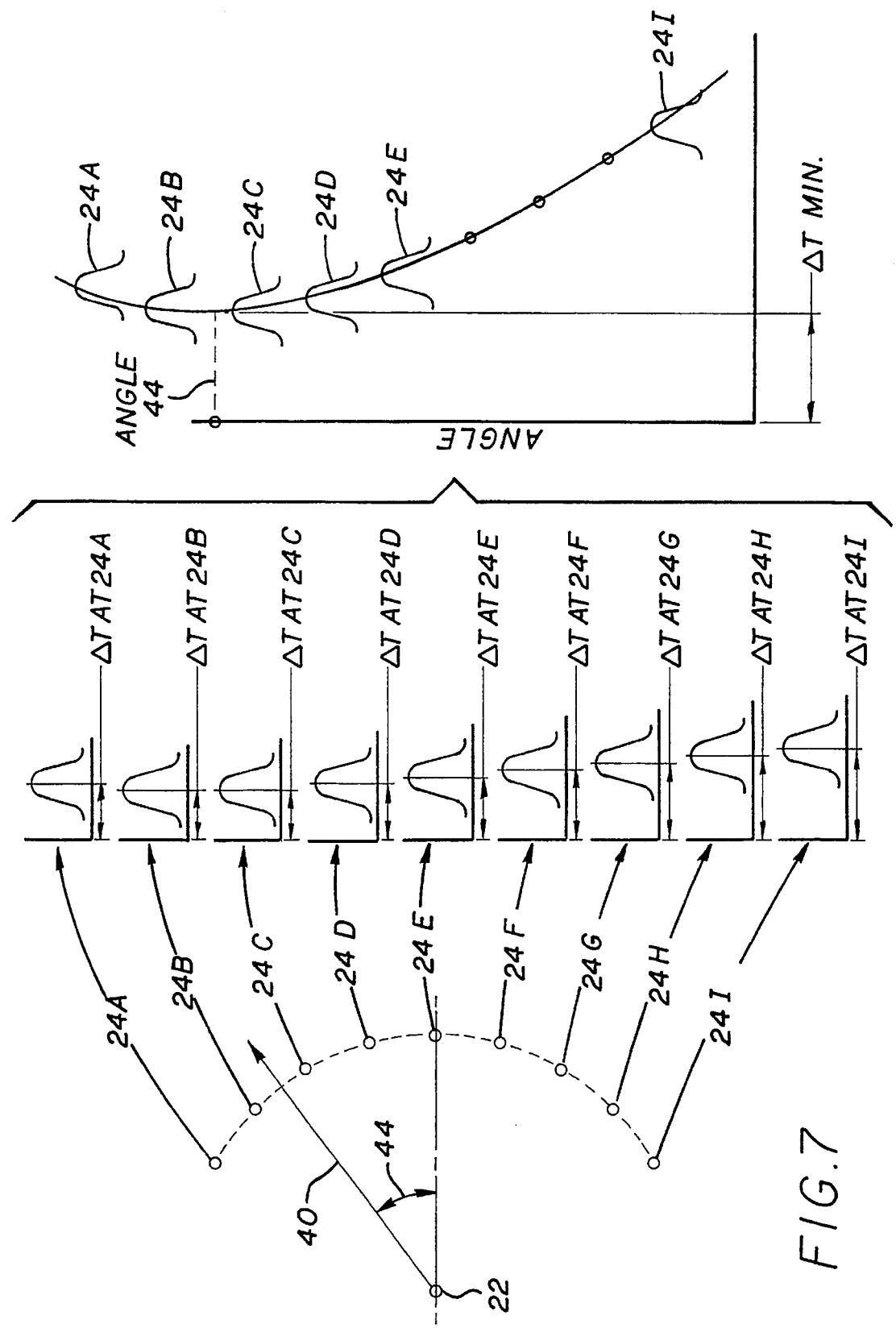
FIG. 7 is a pictorial representation of a method of calculating the travel times of a signal between the reference microphone and microphones of the array and the angle thereof relative to an axis.
Figure 8:
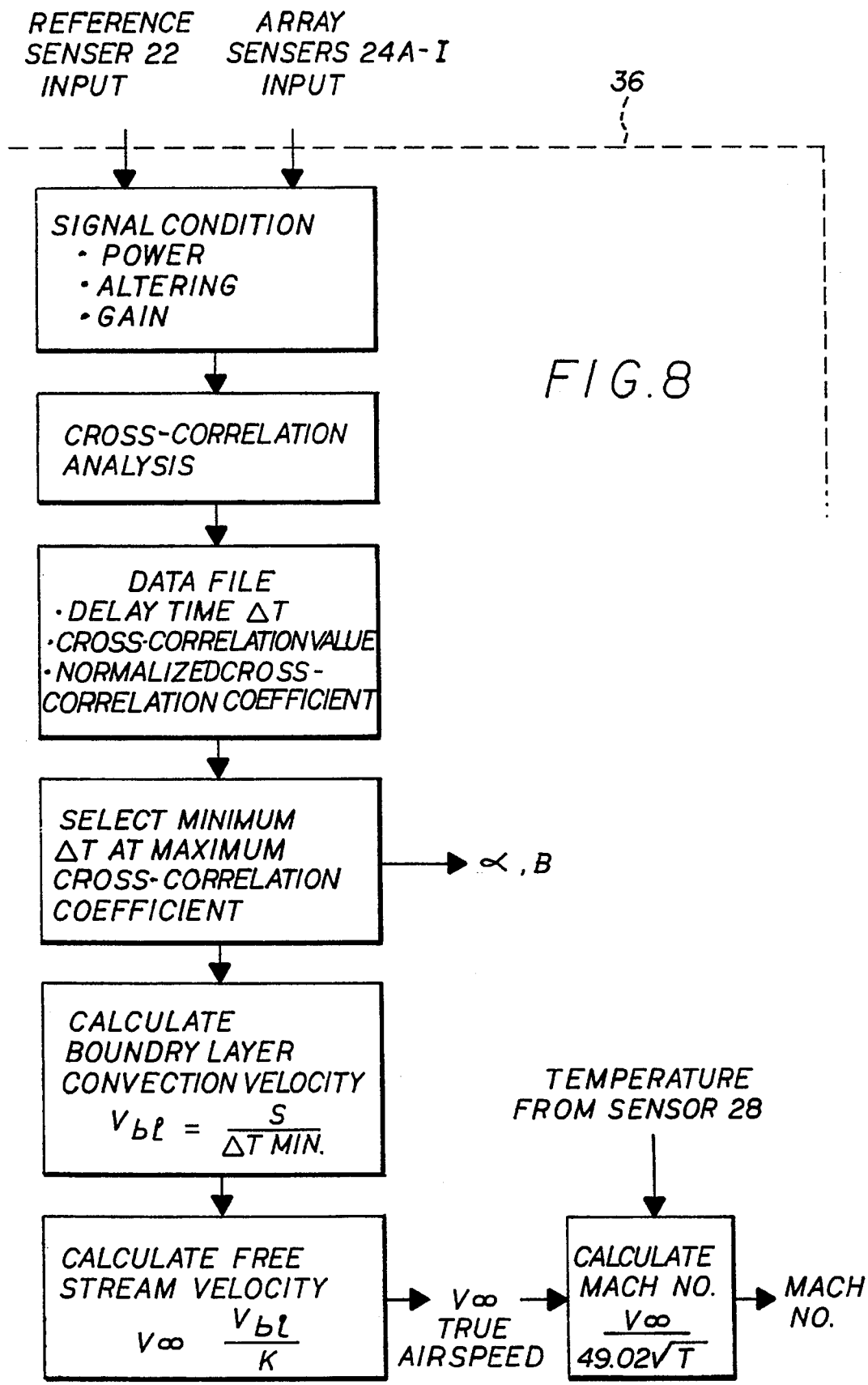
FIG. 8 is flow chart of a computer program for calculating the velocity, angle of attack or yaw, and Mach No.

Referring to FIGS. 4, 7 and 8, by using the above analysis techniques the cross-correlation function is calculated from the measured data at the two sensor locations (for example sensors 22 and 24A). It can be expressed as the integral:

$$R_{ra}(\Delta t) = \frac{1}{2T} \int_{-T}^{T} [f_r(t) * f_a(t + \Delta t)] dt$$

where: $f_r(t)$)=measured data at reference transducer location at time t, $f_a(t+\Delta t)$..=measured data at array transducer location at time $t+\Delta t$.

The normalized cross-correlation coefficient is obtained from the cross-correlation function and auto-correlation function as follows:

$$C_{ra}(\Delta t) = \frac{R_{ra}(\Delta t)}{\sqrt{R_{rr} * R_{aa}}}$$

where:

$$Rrr = \frac{1}{2T} \int_{-T}^{T} [f_r(t) * f_r(t)] dt = \text{Ref. Transducer Auto-Correlation,}$$

and $$R_{aa} = \frac{1}{2T} \int_{-T}^{T} [f_a(t) * f_a(t)] dt = \text{Array Transducer Auto-Correlation}$$

For purposes of illustration, (FIG. 7) suppose that the air stream velocity is indicated by the arrow 40 and lies between sensors 24B and 24C. The computer 28 will continuously calculate correlation values that are stored in memory as a function of the delay time $\Delta t$. The $\Delta t$'s for the peak correlation values for the sensor 22 and each sensor 24A-I are "plotted" and curve fit calculations determine the corresponding minimum $\Delta t$; which in this case will fall between sensors 24B and 24C. With the angular placement between the two sensors pairs 22, and 24B and 24C, the actual angle, indicated by numeral 44 is determined. When the array sensors are located on an arc and equidistant from the reference sensor, the normalized cross-correlation coefficient will be a maximum for the sensor pair exhibiting the minimum $\Delta t$.

The free stream velocity ($V_\infty$) is proportional to the boundary layer eddy convection velocity ($V_{bl}$). The relationship is a function of the location on an aircraft and is also a function of the boundary layer frequency content used in the analysis.

$$V_\infty = \left(\frac{1}{k}\right) * V_{bl},$$

where: k varies between 0.8 and 0.9 as a function of the system. Thus the value of the constant k must be determined experimentally, either by wind tunnel tests or actual aircraft flight tests.

The ambient speed of sound ($C_\infty$) is given by the equation:

$$C_\infty = \sqrt{\gamma g R T_\infty} ,$$

where:

γ=ratio of specific heats (1.4 for air),
g=gravity constant (32.176 ft/sec$^2$)'
R=gas constant (53.3 for air), and
$T_\infty$=absolute free stream temperature (degrees Rankine) measured by radiometer 28 (in the undisturbed atmosphere)

Thus for air at low temperature (i.e. typical of atmospheric flight), the equation becomes:

$$C_\infty = 49.02 \sqrt{T_\infty}$$

and the free stream flight Mach No. is given by the equation:

$$\text{Mach No.} = \frac{V_\infty}{C_\infty}$$

The transit times between the reference sensor and the down-stream array sensors (separated by a distance S) are determined by the peak in the calculated cross-correlation functions for each pair. The minimum time delay for all pairs identifies both the direction of the flow and the convection velocity. The boundary layer convection velocity is simply calculated from:

$$V_{bl} = \frac{S}{(\Delta t_{min})} ,$$

where S=the distance 25 between the sensor 22 and array 24 shown in FIG. 3.

These calculations are routine for modern multi-channel analyzers and are also performed mathematically by software routines which can be incorporated into acquisition/analysis systems. Note that with the inclusion of a properly calibrated static pressure sensor 26, barometric altitude can be obtained. With the water vapor anemometer 30 wet bulb anemometer 31 for determining the dew point, information for activation a contrail suppression system is available.

Figure 9:
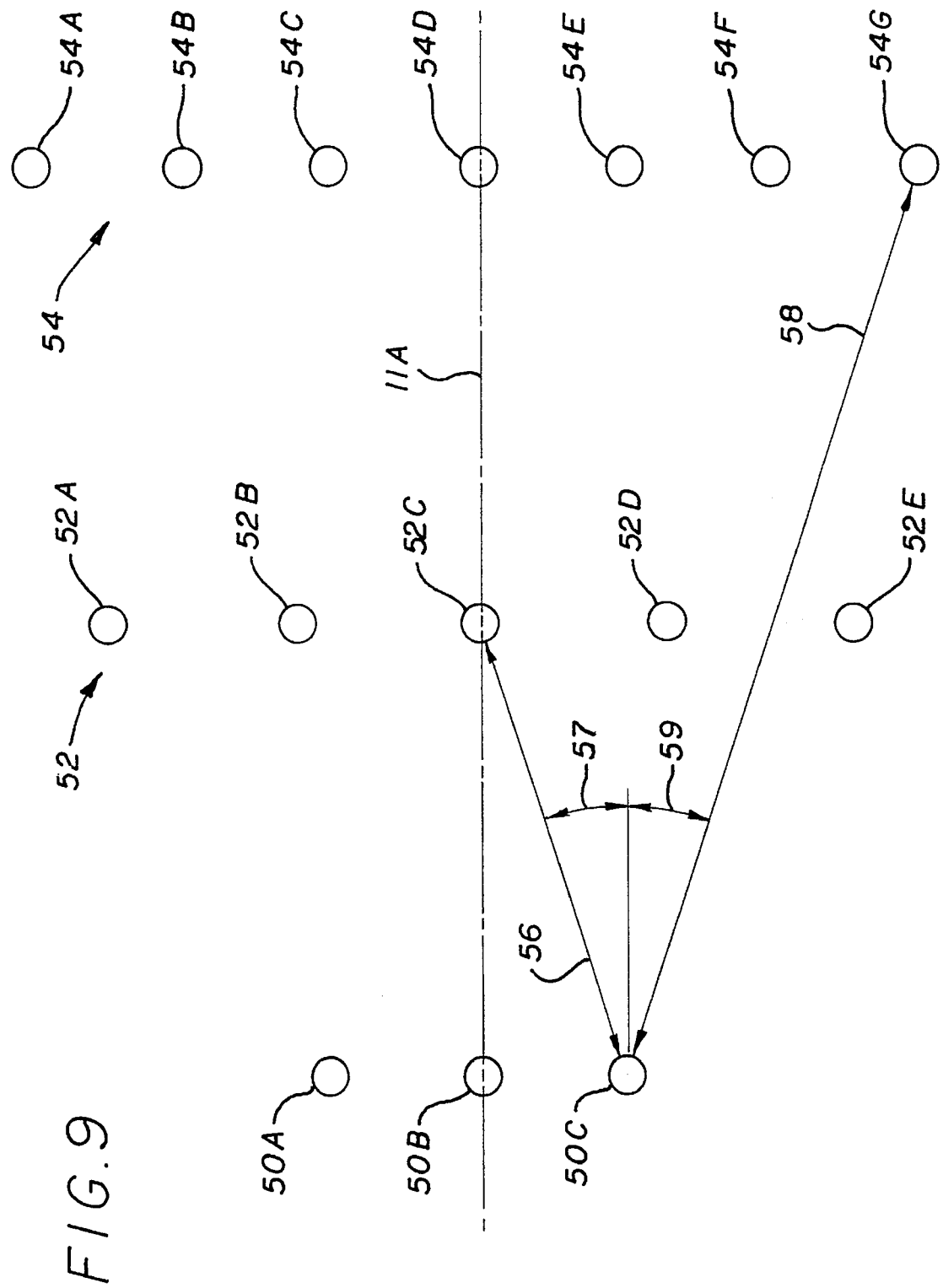
FIG. 9 is a view similar to FIG. 3 illustrating an embodiment of the invention using multiple first sensors and multiple arrays of second sensors.

It should be noted that the invention is not limited to having one reference sensor 22 on the axis 11A and the sensors of the array 24 equally spaced therefrom. Nor must the sensors in the array 24 be equally spaced on either side of the axis 11A. In FIG. 9 a multiple number of reference sensors 50A–C, B and C are used as well as several arrays 52A–E and 55A–G. This requires that the equations take into consideration the difference in distance between each sensor of the arrays 50A and arrays 52A–E and 54A–G. However, it is still an easy task for modern computers. The advantage of this concept, is that necessary redundancy is obtained with a single system.

Although, the preferred embodiment has dealt with an air data system for an aircraft, it is obvious that the invention could be applied to land vehicles as well as ships, even submarines. Additionally, it could just as well be applied to the measurement of gas or liquid flow in pipes and channels. In regard to this later application to pipes and channels, the angle of the flow is always known and one is only interested in flow velocity. Thus in such applications, one would require, at a minimum, only one first dynamic pressure sensor and one dynamic pressure sensor in the array of second sensors with both sensors aligned with the flow path in the tube or channel.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aerospace shipping, and boating industries.

We claim:

1. A system for determining the physical characteristics of an incident fluid flow stream over a surface of a vehicle relative to an axis thereof, the system comprising:

at least one first hydrodynamic pressure sensor means mounted on the surface, at least one array of second dynamic pressure sensor means mounted on the surface down stream of said at least one first sensor means; said at least one first sensor means and said second sensor means of said at least one array for sensing pressure fluctuations generated the fluid in the turbulent boundary layer of the fluid flow stream; and providing first and second output signals, respectively, representative of the pressure fluctuations passing thereover; and means to receive said first and second output signals and to determine the transit time of the pressure fluctuations measured over a discrete period time from said at least one first sensor means to each of said second sensor means of said at least one array and to calculate the convection velocity of the pressure fluctuations within the turbulent boundary layer of the fluid flow stream over the surface.

2. The system as set forth in claim 1 further comprising said means also for receiving said first and second output signals and calculating the angular direction of the fluid flow stream relative to the axis.

3. The system as set forth in claim 2 further comprising said means also for receiving said first and second output signals and calculating the free stream velocity of the fluid flow stream over the surface.

4. The system as set forth in claim 3 further comprising:

temperature sensing means for measuring the temperature of the fluid and providing a third output signal proportional thereto; and said means also for receiving said third signal and calculating the speed of sound within said fluid medium.

5. The system as set forth in claim 4 further comprising:

static pressure sensing means for measuring the static pressure of the fluid and providing a fourth output signal proportional thereto; and said means also for receiving said fourth output signal and calculating the barometric pressure altitude.

6. The system as set forth in claim 5 comprising said means further providing for the calculation of the free stream Mach number of the fluid flow stream over the surface.

7. A system for determining the physical characteristics of an incident fluid flow stream over a surface relative to an axis thereof, the system comprising:

at least one first hydrodynamic pressure sensor means mounted on the surface, at least one array of second dynamic pressure sensor means mounted on the surface down stream of said at least one first sensor means;

said at least one first sensor means and said second sensor means of said at least one array for sensing pressure fluctuations generated within the fluid in the turbulent boundary layer of the fluid flow stream; and providing first and second output signals, respectively, representative of the pressure fluctuations passing thereover; and means to receive said first and second output signals and to determine the transit time of pressure fluctuations measured over a discrete period time from said at least one first sensor means to each of said second sensor means of said at least one array and to calculate the convection velocity of the pressure fluctuations within turbulent boundary layer of the fluid flow stream over the surface.

8. The systenn as set forth in claim 7 further comprising said means also for receiving said first and second output signals and calculating the free stream velocity of the fluid flow stream over the surface.

9. The system as set forth in claim 8 wherein the fluid is confined within a channel, or conduit or the like, said system further comprising only one first hydrodynamic pressure sensor means and only one array of second dynamic pressure sensor means with said array having only one sensor means.

* * * * *